US007647055B2

(12) United States Patent
Gum et al.

(10) Patent No.: US 7,647,055 B2
(45) Date of Patent: Jan. 12, 2010

(54) SYSTEM AND METHOD FOR INTEGRATION OF WIRELESS COMPUTER NETWORK IN POSITION DETERMINING TECHNOLOGY

(75) Inventors: Arnold J. Gum, San Diego, CA (US); Christopher Patrick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 991 days.

(21) Appl. No.: 10/665,747

(22) Filed: Sep. 19, 2003

(65) Prior Publication Data

US 2005/0064877 A1   Mar. 24, 2005

(51) Int. Cl.
*H04Q 7/20* (2006.01)
(52) U.S. Cl. .................... 455/456.1; 455/457
(58) Field of Classification Search .............. 455/414.1, 455/561; 342/457, 357.09; 370/432; 715/774; 705/14; 380/270
See application file for complete search history.

(56) References Cited

U.S. PATENT DOCUMENTS

| 6,249,252 | B1 | 6/2001 | Dupray ................ 342/450 |
| 6,252,543 | B1 | 6/2001 | Camp ................. 342/357.06 |
| 6,785,609 | B2 | 8/2004 | Suda | |
| 2001/0048387 | A1* | 12/2001 | Sheynblat ............. 342/357.09 |
| 2002/0082024 | A1 | 6/2002 | Bajikar ................ 455/456 |
| 2002/0154060 | A1 | 10/2002 | Smith ................. 342/385 |
| 2002/0176579 | A1* | 11/2002 | Deshpande et al. ...... 380/270 |
| 2002/0184418 | A1* | 12/2002 | Blight ................ 710/100 |
| 2003/0046158 | A1* | 3/2003 | Kratky ............... 705/14 |
| 2003/0078054 | A1 | 4/2003 | Okuda | |
| 2003/0118015 | A1* | 6/2003 | Gunnarsson et al. ..... 370/389 |
| 2003/0134646 | A1* | 7/2003 | Forrester ............. 455/456 |
| 2003/0134657 | A1 | 7/2003 | Norta et al. .......... 455/550 |

(Continued)

FOREIGN PATENT DOCUMENTS

JP    11-218571    8/1999

(Continued)

OTHER PUBLICATIONS

International Preliminary Examination Report-PCT/US04/030797, International Preliminary Examination Authority, Alexandria, Virginia, US-Feb. 1, 2006.

(Continued)

*Primary Examiner*—Lester Kincaid
*Assistant Examiner*—Phuoc Doan
(74) *Attorney, Agent, or Firm*—Bruce W. Greenhaus; Linda G. Gunderson (57) ABSTRACT

A wireless communication device, known as a mobile station (MS), contains a conventional wireless communication system and further comprises a wireless computer network communication subsystem and may also include GPS capability. The operator of the MS may utilize any or all of these subsystems to determine the current position of the MS. Based on the current position of the MS, location-based services are provided to the MS as sales information, schedules, prices, maps, and the like. In a typical implementation a plurality of computer network access points, or beacons, are distributed throughout a geographic region and used to determine the position of the MS with a reasonably high degree of accuracy. Based on the current position of the MS, the beacons can provide location-based services.

32 Claims, 7 Drawing Sheets

U.S. PATENT DOCUMENTS

| | | |
|---|---|---|
| 2003/0222819 A1* | 12/2003 | Karr et al. .................. 342/457 |
| 2004/0030601 A1* | 2/2004 | Pond et al. .................... 705/16 |
| 2004/0043758 A1* | 3/2004 | Sorvari et al. ........... 455/414.1 |
| 2004/0120323 A1* | 6/2004 | Viikari et al. ............ 370/395.5 |
| 2004/0176958 A1* | 9/2004 | Salmenkaita et al. ........ 704/275 |
| 2004/0253984 A1* | 12/2004 | Csapo et al. ................ 455/561 |
| 2005/0039136 A1* | 2/2005 | Othmer ...................... 715/774 |
| 2005/0060118 A1* | 3/2005 | Pavel et al. ................. 702/150 |
| 2005/0063409 A1* | 3/2005 | Oommen ................... 370/432 |

FOREIGN PATENT DOCUMENTS

| | | |
|---|---|---|
| JP | 2000-132797 | 5/2000 |
| JP | 2002-318272 | 10/2002 |
| JP | 2003-087847 | 3/2003 |
| JP | 2003-194912 | 7/2003 |
| KR | 2003-0040200 | 5/2003 |
| RU | 2201034 | 3/2003 |
| RU | 30440 | 6/2003 |
| RU | 31666 | 8/2003 |
| RU | 32309 | 9/2003 |
| WO | 9615636 | 5/1996 |
| WO | 99006851 | 2/1999 |
| WO | 9961934 | 12/1999 |
| WO | 0131966 | 3/2001 |
| WO | 0150151 | 7/2001 |
| WO | 0159938 | 8/2001 |
| WO | 03058985 | 7/2003 |

OTHER PUBLICATIONS

Written Opinion—PCT/US04/030797, International Search Authority-European Patent Office-May 17, 2005.

International Search Report—PCT/US04/030797—International Search Authority—European Patent Office—May 17, 2005.

* cited by examiner

SYSTEM AND METHOD FOR INTEGRATION OF WIRELESS COMPUTER NETWORK IN POSITION DETERMINING TECHNOLOGY

BACKGROUND

1. Technical Field

The present invention relates generally to the integration of wireless computer network technology in position determination and, more particularly to the use of wireless computer network access points as an additional source of location information to supplement or replace that provided by more conventional sources such as GPS, particularly in environments where traditional methods such as GPS exhibit reduced performance.

2. Description of the Related Art

A number of different techniques are used for position determination of a mobile device. One known technology utilizes satellites in a global positioning system (GPS) constellation. A GPS receiver detects signals from a plurality of GPS satellites and calculates the position of the GPS receiver. If a sufficient number of satellites are detected and the signal quality is good, the GPS receiver can make a highly accurate position determination.

Under certain conditions, the received GPS signals may be insufficient for an accurate position determination. In an alternative, sometimes referred to as mobile-assisted position determination, the data detected by the GPS receiver is transmitted, via a communication network, to a positioning server or position determining entity (PDE). The PDE uses the data provided by the mobile GPS receiver in combination with other location-related data to determine the position of the GPS receiver at the time data was initially received by the GPS receiver. The PDE can determine the position of the GPS receiver with a high degree of accuracy under optimal GPS signal conditions.

Under adverse operating conditions, or in the presence of obstructions, the GPS receiver may be unable to detect the signals from a sufficient number of satellites or those signals may be affected by sources of error such as signal multi-path or dilution of precision, making an accurate position determination difficult. Natural obstructions, such as trees and mountains, may block or deflect signals from the GPS satellites. Man made obstructions, such as buildings and bridges, may also impact signals from the GPS satellites. Under such circumstances, GPS receiver-based positioning may be subject to significant error. This problem is even more pronounced if the GPS receiver is taken indoors. The building walls, metal structures, and the like can severely attenuate the signals from the GPS satellites thus making an accurate position determination very difficult.

Wireless service providers have developed an alternative technique for position determination that does not rely on GPS signals. In a wireless communication system, sometimes referred to as a cellular or cell phone system, a mobile unit receives signals from one or more base transceiver stations (BTS). A typical BTS has an area of coverage, sometimes called a cell, that roughly resembles a circle with the BTS located approximately at the center of the circle or, alternatively, some sector of that circle. Using known techniques, it is possible for a PDE to determine that a mobile unit is located within the area of coverage of a particular BTS and, in some instances, within range of one or more BTS. If the BTS area of coverage is large, the position determination is less accurate. Conversely, if the are of coverage is small, the position determination is more accurate.

A typical BTS uses a multiple antenna array to subdivide a cell into sectors. For example, a particular cell may have three sectors of roughly equal size. Using the techniques described above, it is possible to locate the position of the mobile unit not only within a particular cell, but within a particular sector of that cell. In addition, it is possible to make a rough determination of the distance between the mobile unit and the BTS based on factors, such as signal strength or time delay of a received signal.

For example in one implementation, such as a code division multiple access (CDMA) wireless system, a pilot channel is transmitted by each BTS. The pilot channel allows a wireless cellular telephone to acquire proper timing and frequency reference; the pilot signals can also be used to calculate a phase offset which, when combined with delay information or with offset information from multiple BTSs, can be used to calculate position. Signal strength comparisons between multiple BTSs are also used to determine when to hand off the mobile unit to another BTS. Multiple pilot signals can also be used to trilaterate the position of a mobile unit, or a single pilot used to determine position within a particular cell and/or within a particular sector within that cell. In some technologies, a received signal strength index (RSSI) may also be calculated using known techniques and used to determine an approximate distance between the mobile unit and the BTS. However, the accuracy of such a determination is limited by the inherent inaccuracies in the measurement system described above.

The GPS location system is highly accurate, but does not provide reliable position determination in areas where clear reception of satellite signals are unavailable, such as indoors. A wireless communication system, such as the CDMA system described above, may provide better reliability in detection of signals, but is often less accurate than a GPS system.

Thus, there is a need in the art for an improved position detection system that allows improved position determination while indoors that is less impacted by signal deflection, multi-path and attenuation and further capable of providing location-based services to the consumer. The present invention provides this and other advantages as will be apparent from the following detailed description and accompanying figures.

BRIEF SUMMARY

The present disclosure relates to a system and method for position determination and delivery of location-based services using a mobile communication device. In one embodiment, the system comprises a wireless network transceiver configured to communicate with a network wireless access point, with the transceiver receiving data from the access point. A position determining entity determines the position of the mobile communication device based on the data received from the access point or some combination of that data and data from other sources, such as GPS. A display on the mobile communication device displays data based on the determined position.

The displayed data may be position data related to the position of the mobile communication device. Alternatively, the displayed data may be non-position information, such as sales information, advertisements, and the like related to a store located proximate the determined position of the mobile communication device.

In one embodiment, the transceiver communicates a request to the wireless access point for non-position information based on the determined position of the mobile communication device. Such information can, by way of example, include a request for sales information or assistance in a store located proximate the determined position of the mobile communication device.

In one embodiment, the wireless computer network transceiver is configured for operation in accordance with an industry standard IEEE 802.11 wireless network standard. The communication device may further comprise a global positioning system (GPS) receiver to receive data from a plurality of GPS satellites with the position determining entity using data received from the GPS satellites to determine the position of the mobile communication device.

The system may further comprise a wireless telephone receiver to receive communication signals from a base transceiver station with the position determining entity using communication signals from the base transceiver station to determine or assist in the determination of the position of the mobile communication device. In one embodiment, the wireless telephone receiver is configured for code division multiple access (CDMA) operation with the communication signals from the base transceiver station being CDMA pilot channel signals.

In another embodiment, the mobile communication device comprises a GPS receiver, a wireless telephone receiver and a wireless computer network transceiver. A position determining entity determines the position of the mobile communication device based on data received from the GPS satellites, if available with an acceptable error range, communication signals from the base transceiver station, if available with an acceptable error range, and the data received from the network wireless access point. In one embodiment, the position determining entity may weight the position data from all sources based upon which source of information is deemed most reliable for the final position calculation.

DETAILED DESCRIPTION

Figure 1:
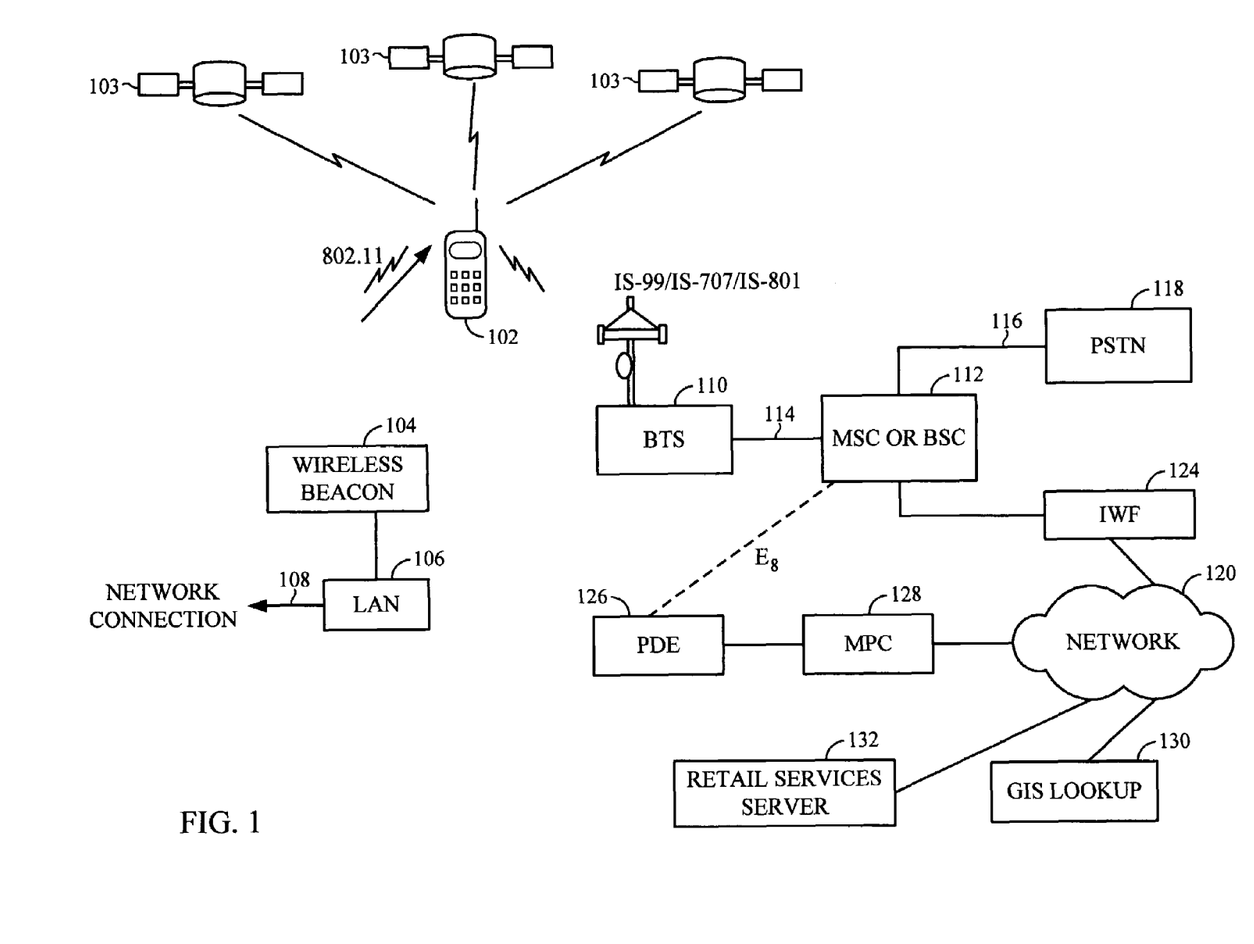
FIG. 1 is a diagram illustrating the architecture of a communication system described herein.

The present disclosure is directed to techniques for the use of a wireless computer network communication system for position determination and for delivery of location-based services. The wireless computer network system may be integrated with other position determining technologies, such as a global positioning system (GPS) and communication network trilateration. An exemplary implementation is illustrated in a system 100, shown in the diagram of FIG. 1. FIG. 1 illustrates the operation of the system 100 with a mobile station (MS) 102. The MS 102 is sometimes referred to as a wireless communication device, cellular telephone, or other position-enabled device. As will be described in greater detail below, the MS 102 can function as a conventional cellular telephone, a GPS receiver, and a computer wireless network computing device.

In operation as a GPS receiver, the MS 102 operates in a conventional manner to receive communication signals from a plurality of GPS satellite vehicles (SVs) 103.

In operation as a wireless network-based computing device, the MS 102 communicates with a wireless computer network access point 104, sometimes referred to as a beacon. In a typical implementation, the access point or beacon 104 is coupled to a local area network (LAN) 106 which, in turn, is coupled via a network connection 108, to a computer network, such as the Internet or a self-contained computer network (not shown).

In the embodiment illustrated in FIG. 1, the MS 102 also functions as a cellular telephone and communicates with a base transceiver station (BTS) 110. The MS 102 may be a conventional wireless telephone for use with various known communication protocols, such as code division multiple access (CDMA), GSM, AMPS, or the like. Operation of the MS 102 as a cellular telephone is well known in the art and need not be described herein except as it relates to an integrated system for position determination and delivery of location-based services. As those skilled in the art can appreciate, a particular geographic area includes a plurality of BTSs distributed throughout the region to provide cell phone coverage. In operation, the MS 102 may communicate with one or more BTS. However, for the sake of simplicity, only the BTS 110 is illustrated in FIG. 1.

The BTS 110 is coupled to a mobile switching center (MSC) 112 via a communication link 114. In turn, the MSC 112 is coupled to various other system components using known technology. For example, the MSC 112 is coupled to a public switched telephone network (PSTN) 118 via a communication link 116. The MSC 112 is also coupled to a data network 120. In a typical embodiment, the network 120 may use the Internet Protocol (IP), which is well-known in the art. The MSC 112 is coupled to the network 120 via a network interface, sometimes referred to as an interworking function (IWF) 124.

The MSC 112 is also coupled to a position determination entity (PDE) 126. Those skilled in the art will appreciate that the PDE 126 is often used in a process known as network assisted MS-Assisted or mobile-assisted position determination. In this mode of operation, the PDE 126 may receive position-related data from the MS 102, the BTS 110 and the MSC 112. The data from the MS 102 may comprise GPS data or communication control signals, such as data derived from the pilot channel. The PDE 126 analyzes the various pieces of position related data and determines the position of the MS 102 at the time the position-related data was generated. The PDE relays the position determination back to the MS 102 via the BTS 110 or sends position determination data to other requesting entities as appropriate via a mobile positioning center (MPC) 128.

The MPC 128 operates in a known fashion for access control to the PDE 126 and to authenticate positioning requests. The PDE 126 may communicate with the MSC 112 via the MPC 128. In the embodiment illustrated in FIG. 1, the MPC 128 is coupled to the network 120. The MPC 128 can communicate with the MSC 112 via the network 120 or via a direct communication link (not shown).

Also illustrated in FIG. 1 is a geographic information system (GIS) 130, which is coupled to the network 120. The GIS 130 is a database to access information for location-based services. As will be described in greater detail below, the position of the MS 102 may be determined using the PDE 126 or from position data related to the beacon 104. When the position of the MS 102 has been determined, the GIS 130 can access the database to determine what services are available for the current location of the MS 102. Examples of location-based services are provided below.

Also illustrated in FIG. 1 is a retail services server 132. As will be described in greater detail below, the retail services server 132 may provide information for display on the MS 102 for retail services proximate the location of the MS 102.

Figure 2:
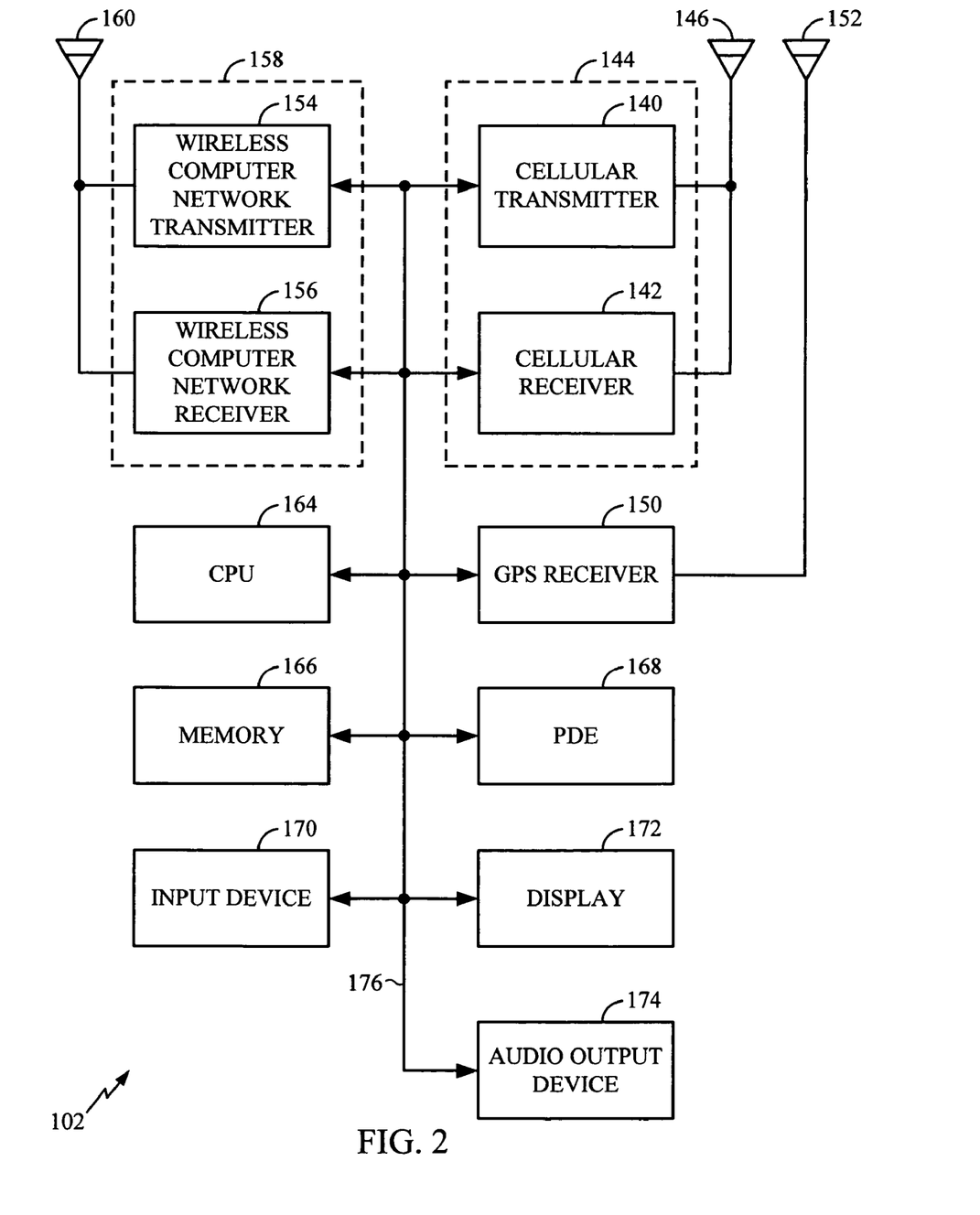
FIG. 2 is a functional block diagram of a typical mobile station implementing the communication system described herein.

The MS 102 is illustrated in greater detail in the functional block diagram of FIG. 2. In a typical implementation, the MS 102 comprises a cellular transmitter 140 and a cellular receiver 142. The cellular transmitter 140 and cellular receiver 142 may sometimes be combined into a single cellular transceiver 144, illustrated by the dashed lines in FIG. 2. A cellular antenna 146 is coupled to the cellular transmitter 140 and cellular receiver 142. Those skilled in the art will appreciate that the term "cellular" is used in a generic sense and is intended to encompass known forms of wireless telephone communication. For example, an advanced mobile phone system (AMPS) is a known analog communication system operating at approximately 800 megahertz (MHz). Digital wireless communication systems may also operate in the 800 MHz region. Other wireless telephone devices, sometimes referred to as personal communication system (PCS) devices are digital communication devices that operate in the 1900 MHz region. Still other wireless devices utilize a digital communication standard known as a global system for mobile communication (GSM). The term cellular, as used herein, is intended to encompass these communication standards and any other wireless telephone technology.

In a typical embodiment, the MS 102 also comprises a GPS receiver 150, which is connected to a GPS antenna 152. The GPS receiver 150 and GPS antenna 152 operate in a known manner to receive signals from a plurality of GPS SVs 103 (see FIG. 1). The use of GPS signals for position determination is well known in the art, and need not be described in greater detail herein. Those skilled in the art will appreciate that the position determination performed by the GPS receiver 150 is highly accurate if it receives adequate signals from a sufficient number of SVs 103.

The MS 102 also includes a wireless computer network transmitter 154 and a wireless computer network receiver 156. The wireless computer network transmitter 154 and wireless computer network receiver 156 may be combined to form a wireless computer network transceiver 158, illustrated by the dashed lines in FIG. 2. The wireless computer network transmitter 154 and wireless computer network receiver 156 are coupled to a wireless computer network antenna 160. Those skilled in the art will recognize that the cellular antenna 146, GPS antenna 152 and wireless computer network antenna 160 may be implemented as separate antennas, as illustrated in FIG. 2, or combined into a single antenna using known techniques.

In one implementation, the wireless computer network transceiver 158 operates in accordance with wireless computer network standard IEEE 802.11, sometimes referred to as the "WIFI" standard. As will be discussed in greater detail below, the wireless computer network transceiver 158 can be used to provide or supplement position information in settings where the GPS receiver 150 does not receive adequate signals from the SVs 103 to make the appropriate position determination.

Alternatively, the wireless computer network transceiver 158 may be configured for operation in accordance with Bluetooth communication standards. Those skilled in the art will appreciate that Bluetooth standards define a wireless communication interface operating in the 2.4 Gigahertz ISM (Industrial Scientific Medicine) band. Bluetooth specifications call for frequency hopping implementation to reduce interference with other devices operating in the 2.4 GHz ISM band. The technical details of communication utilizing Bluetooth technology is well known in the art, and need not be described in greater detail herein.

Within the MS 102 is a central processing unit (CPU) 164, which controls operation of the MS 102. Those skilled in the art will appreciate that the CPU 164 is intended to encompass any processing device(s) capable of operating MS 102 and its various communication subsystems. This includes microprocessors, embedded controllers, application specific integrated circuits (ASICs), digital signal processors (DSPs), state machines, dedicated discrete hardware, and the like. The present invention is not limited by the specific hardware component or components selected to implement the CPU 164.

The system also includes a memory 166, which may include both read-only memory (ROM) and random access memory (RAM). The memory 166 provides instructions and data to the CPU 164. A portion of the memory 166 may also include nonvolatile random access memory.

A position determining entity (PDE) 168 determines the current position of the MS 102. The operation of the PDE 168 will be discussed in greater detail below. In an alternative embodiment, at least a portion of the PDE 168 may be located remotely from the MS 102. In this embodiment, the remote PDE (e.g., the PDE 126 in FIG. 1) makes the position determination and transmits position information and/or position-related data to the MS 102 or other requesting entity.

Also illustrated in the functional block diagram of FIG. 2 are input/output (I/O) devices, such as an input device 170, a display 172 and an audio output device 174. In a typical implementation, the input device 170 is a keypad. In one embodiment, the keypad includes alphanumeric keys, such as found in a typical cellular telephone. Additional keys may be used to initiate a position determination, while other keys may be used to control the display 172 or the audio output device 174.

The display 172 may be a conventional display, such as a liquid crystal display, and may be a monochrome or color display. The operational details of the display 172 are well known in the art and need not be described in greater detail herein. As will be described below, the display 172 may provide location-based services to the user of the MS 102.

The audio output device 174 may be implemented by a conventional cellular telephone speaker. Those skilled in the art will recognize that any conventional audio output device may be satisfactorily used as the audio output device 174.

The various components described above are coupled together by a bus system 176. The bus system 176 may include a data bus, power bus, control bus, and the like. However, for the sake of clarity, the various buses are illustrated in FIG. 2 as the bus system 176.

Those skilled in the art will appreciate that the functional block diagram of FIG. 2 is intended to illustrate the MS 102 at a functional level and that some functional blocks or portions thereof may be implemented by a set of software instructions stored in the memory 166 and executed by the CPU 164. For example, the PDE 168 may, in fact, be implemented in software and executed by the CPU 164. However, the PDE 168 is illustrated as a separate block in the functional block diagram of FIG. 2 because it performs a separate function.

In operation, the various position determination components of the MS 102 illustrated in FIG. 2 are used alone or in conjunction with each other to determine the present position of the MS 102. As previously noted, the GPS receiver 150 provides a very accurate position determination if a sufficient number of SVs 130 (see FIG. 1) are detected and have sufficient signal quality to perform the position determination. In some situations where the GPS receiver 150 is incapable of performing a satisfactory position determination, the cellular communication system may be used instead of the GPS receiver 150 or in conjunction with the GPS receiver to determine the present position of the MS 102. As discussed above, the signals from the cellular telephone system can be used in a known manner to determine the position of the MS 102 when the GPS receiver 150 is incapable of performing a position determination. However, as discussed above, the position determination by the cellular telephone system is less accurate than that of the GPS receiver 150.

Under other operating conditions, neither the GPS receiver 150 nor the cellular communication are capable of generating an acceptable position determination. This is particularly true in areas where buildings, metal structures and the like block signals from the SVs 130 (see FIG. 1) as well as signals from the BTS 110. Under such operating conditions, the wireless computer network transceiver 158 may be used to provide more accuracy than available through either network trilateration or GPS.

Figure 3:
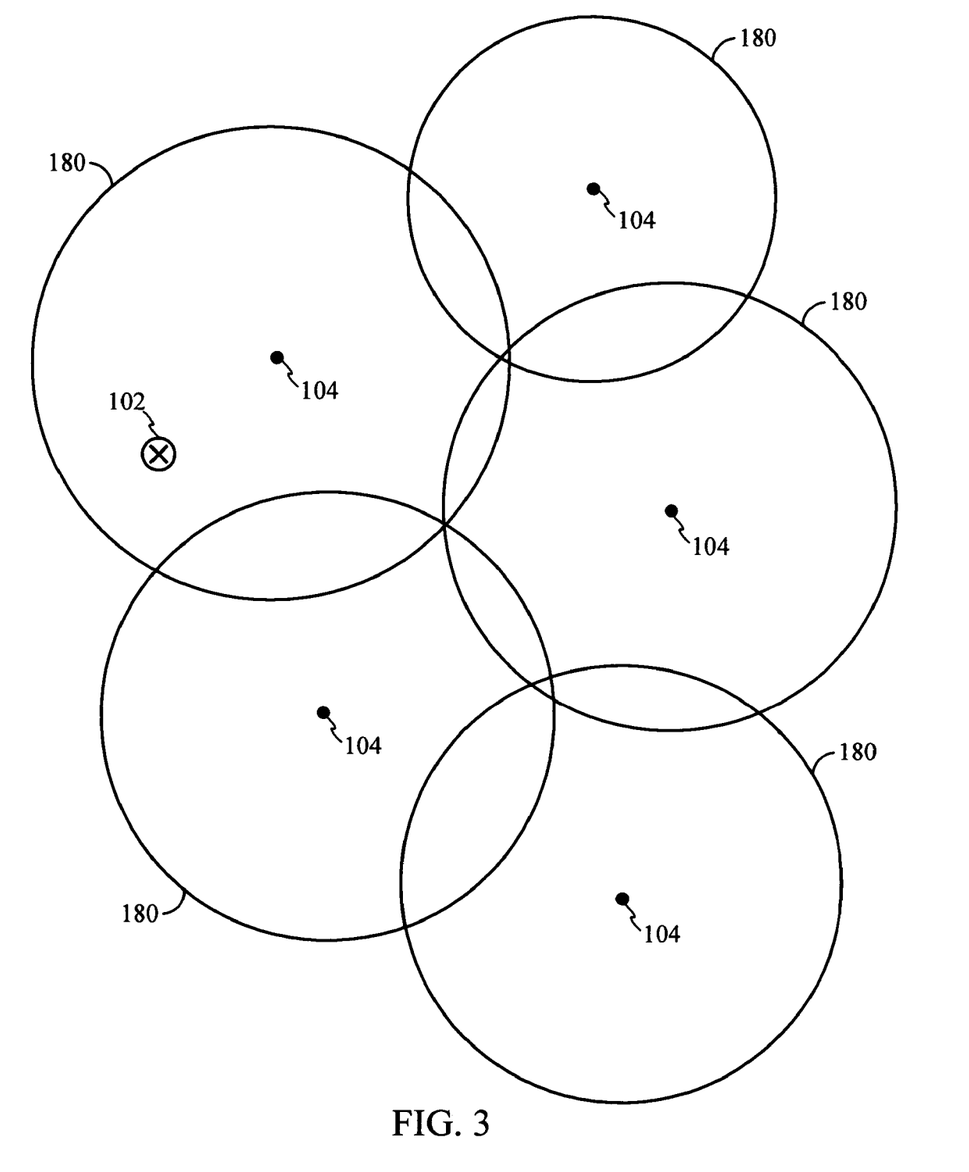
FIG. 3 is a diagram illustrating coverage areas of multiple wireless computer network access points.

The wireless computer network transceiver 158 communicates with the wireless communication network access point 104, sometimes referred to as a beacon. FIG. 1 illustrates the communication link between the MS 102 and the beacon 104. However, in a typical implementation, a plurality of beacons 104 are distributed throughout a geographic region, as illustrated in FIG. 3. As illustrated in FIG. 3, each of the beacons 104 has a coverage area 180 associated therewith. Because the radio frequency (RF) signals from each beacon 104 radiate equally in all directions, the coverage area 180 for each beacon is illustrated as a roughly circular shape in a two dimensional shape of FIG. 3. In reality, the area of coverage extends radially outward in all directions to provide a roughly spherical coverage area 180. The coverage area 180 of each beacon 104 may be somewhat larger or smaller depending on transmission power of the beacon as well as obstructions that tend to block or attenuate the radio signals. In addition, obstructions may alter the shape of the coverage area 180 somewhat. However, for the sake of convenience, the coverage area 180 for each beacon 104 in FIG. 3 are illustrated as a series of slightly overlapping circles.

The coverage area 180 for each beacon 104 may be thought of as a "microcell." The position of the MS 102 may be readily determined by the ability of the MS to communicate with a particular one or more of the beacons 104. In a typical implementation, the coverage area 180 has a radius of approximately 15-20 meters if constructed in accordance with IEEE 802.11. If the beacon 104 is implemented in accordance with Bluetooth standards, the coverage area 180 has a radius of approximately 10 meters if operating in a low power mode and approximately 100 meters if operating in a high power mode. By way of comparison, GPS position determination can be accurate within approximately 5 meters assuming that a sufficient number of satellites can be detected. Although position determination using the beacons 104 is somewhat less accurate than GPS, it has the advantage of working well indoors. Furthermore, due to the proximity of the beacons/ microcells, position determination using the beacons 104 can be more accurate than conventional triangulation techniques using signals detected by multiple BTSs 110 in dense urban or deep indoor scenarios. The accuracy of BTS triangulation varies by terrain and geometry but, in public filings, has been approximately 500 meters. Position determination using wireless data communication signals, such as IEEE802.11 (WIFI) or BlueTooth has an accuracy bounded by the range of the signal. Therefore, a beacon 104 with a range of 10 meters, if detected, should provide approximately 10 meter or better location accuracy. Thus, the position of the MS 102 can be readily determined with a reasonable degree of accuracy by virtue of its ability to communicate with a particular one of the beacons 104.

In one embodiment, the MS 102 may communicate with one or more beacons 104. The PDE 168 may determine the position of the MS 102 based on a variety of factors. For example, if the MS 102 is able to communicate with only one beacon, the MS 102 is within the area of coverage 180 of that particular beacon. If the MS 102 communicates with multiple beacons 104, the PDE 168 may make a position determination based on a number of alternative criteria. For example, the PDE 168 may determine the relative power of the signal from each of the beacons with which it is communicating and the predetermined range of any given beacon and select the beacon 104 having the smallest predicted error, based upon having the greatest signal strength, the shortest range, or some combination of the two. The position of the MS 102 is therefore presumed to be within the coverage area 180 of the selected beacon 104. In yet another alternative, the PDE 168 may perform a mathematical calculation to determine the position of the MS 102. For example, if the MS 102 communicates with two beacons 104, the PDE may determine the position of the MS 102 at a point halfway between the beacons 104 or weighted appropriately based on a predicted range of each beacon 104 and signal strength. In yet another alternative embodiment, signal strength may be used as a weighting factor. For example, if the MS 102 is communicating with two beacons 104 with one beacon having twice the signal strength, range capability being equal, the PDE 168 may determine the position to be closer to the beacon 104 have greater signal strength. A number of other alternative calculations may be performed by the PDE 168.

The implementation discussed above illustrates the PDE 168 as a portion of the MS 102. In other applications, the PDE is located remote from the MS 102. For example, FIG. 1 illustrates the PDE 168 coupled to the network 120. The beacon 104 may communicate with the PDE 126 via the network 120 to determine the position of the MS 102. In another alternative embodiment, the PDE may be more closely associated with the beacon. For example, the PDE may be coupled to the LAN 106 to perform position determinations on a more localized basis. The advantage of locating the PDE remote from the MS 102 is that software updates and new position determination algorithms may be more easily implemented and updated via a computer network-based server. Implementation of the PDE 168 within the MS 102 may require periodic software updates. These updates may be performed via conventional over-the-air programming or may require the user to return the MS 102 to a service provider for reprogramming.

As illustrated in the example embodiment of FIG. 1, each beacon 104 is coupled to the network connection 108 either directly or via the LAN 106. The actual implementation depends on the particular application. For example, the system 100 could be implemented in a shopping mall where a series of beacons 104 are distributed throughout the mall. A consumer may use the MS 102 to accurately determine their location within the shopping mall. In turn, the beacon 104 with which the MS 102 is communicating can deliver location-based services (LBS) based on the determined position. For example, the beacon 104 can provide a map of the shopping mall on the display 172 (see FIG. 2). In one embodiment, the display 172 may have an indicator showing the present position of the MS 102 within the shopping mall.

The position of each beacon 104 can be precisely determined by network assisted position determination technology, known in the art, to provide accurate position data (i.e., latitude, longitude and altitude) for each beacon 104 or the precise location can be based upon a geocode lookup based upon the address. In this embodiment, the beacon 104 can make a position determination request to the PDE 126, which may deliver the position data to the beacon via the network 120. Alternatively, the precise latitude, longitude and altitude of the beacon 104 may be determined at the time of installation and preprogrammed into the beacon 104 using, by way of example, the management information base (MIB) of the beacon itself. Those skilled in the art will recognize that the MIB typically stores network information, user information, log-in status, and the like. In this embodiment, the MIB is expanded to include data indicating the latitude, longitude and altitude of the beacon 104 and/or address.

In accordance with IEEE802.11, each beacon 104 has an identification name and/or number. The MS 102 must have the proper identification information to communicate with the beacon 104. In an implementation, such as illustrated in FIG. 3, the MS 102 must have the identification data for each beacon 104. A number of possible solutions may be provided by the system 100 to permit effective communication between the MS 102 and the beacons 104. In one embodiment, all beacons 104 of this type may have a common name thus allowing any MS 102 to communicate effectively with any beacon 104. In an alternative embodiment, the MS 102 may have a "sniffer" program that sniffs out and retrieves the name of the beacon 104. Although sniffers are not generally used in a commercial mass-market wireless communication device, such as the MS 102, sniffers are known in the art for use with a wireless LAN to sniff out and retrieve the name of a wireless LAN with which a computer may communicate. A similar implementation in the MS 102 will permit the retrieval of names for each of the beacons 104.

Another possible alternative is to create a special class of beacons under IEEE 802.11. The special class of beacons 104 can be available to all users. Identification information transmitted by the MS 102 can be used to authorize or prevent access to unauthorized portions of the computer network. For example, it is possible to prevent Internet access utilizing the beacons 104 of the systems 100.

Figure 4:
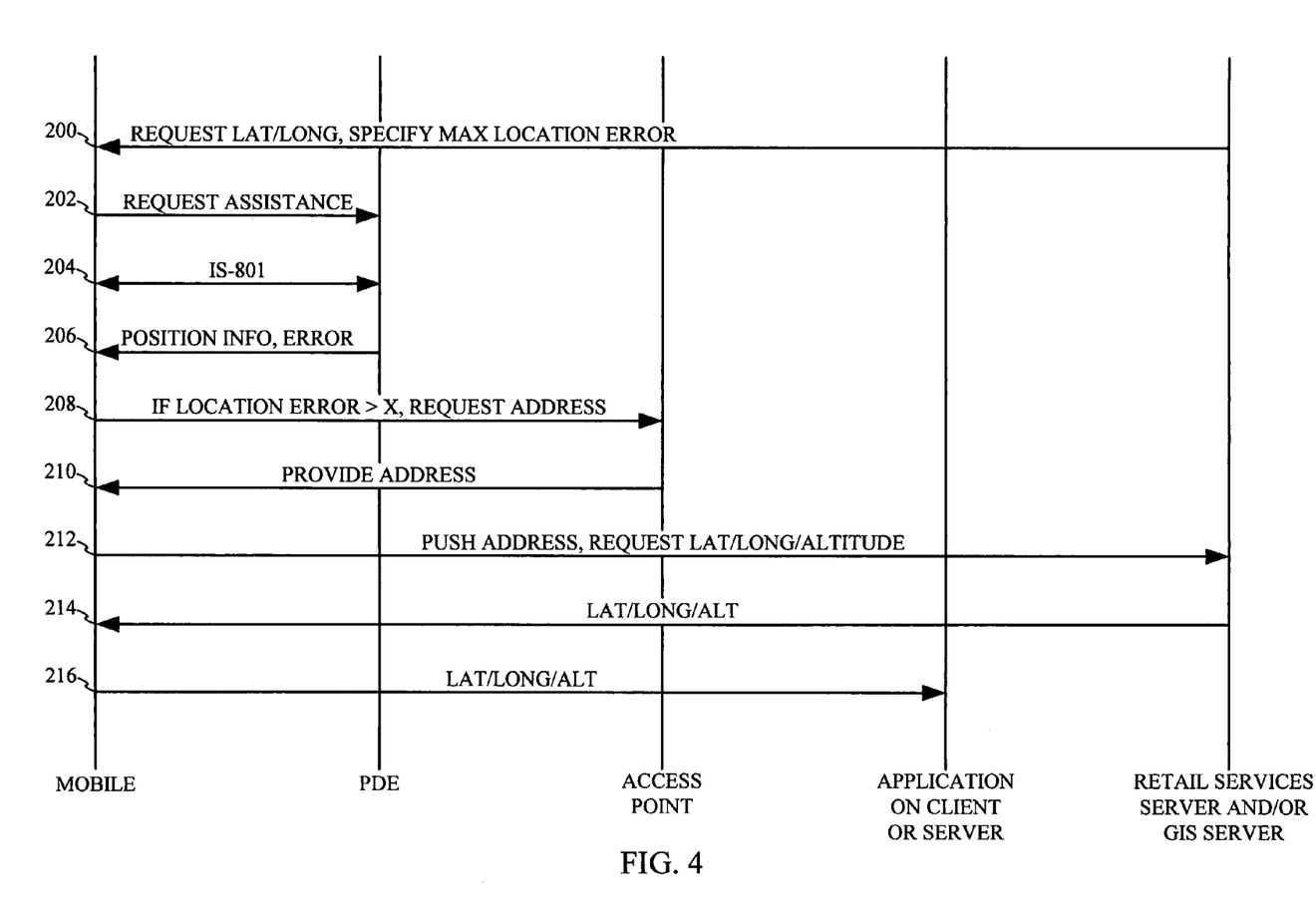
FIG. 4. illustrates a communication protocol for position determination.

FIG. 4 illustrates a communication protocol for use with the system 100 for position determination. At 200, an application program on a client or server transmits a request for latitude and longitude to the MS 102. The request may typically specify a maximum allowable location error. It should be noted that the application program may be executed by the CPU 164 within the MS 102 or executing on an external device, such as a server coupled to the LAN 106 (see FIG. 1). At 202, the MS transmits a request for position determination assistance. The assistance may be in the form of network assisted position determination, as described above. At 204, communication occurs between the BTS 110 (see FIG. 1) and the MS 102 in accordance with the communication standard IS 801.11 (or successors), which is a protocol for position determination by an external PDE, such as the PDE 126 in FIG. 1.

At 206, the PDE (e.g., the PDE 126) returns the position information and an error value. The error value indicates the error range in the position determination performed by the PDE.

In 208, the MS 102 transmits an address or positioning request to the beacon 104 if the position error transmitted at 206 exceeds some predetermined value X. In response to the request for an address, the beacon 104 provides the beacon latitude and beacon longitude and/or the street address to the MS 102. In many cases, street address is sufficient position determination information for a user. If the user is in an interior area such as, by way of example, a shopping mall, other position information may be provided instead of a street address. For example, a store name, number, or other identification may be provided to the user.

With address information, the MS 102 can request specific position information in 212. The request may be made via the cellular transmitter 140 (see FIG. 2) to the BTS 110 and relayed to the GIS 130 via the network 120. Alternatively, the MS 102 may transmit the address and request position information (e.g., latitude, longitude and altitude) using the wireless computer transmitter 154 to communicate with the beacon 104. The beacon 104 transmits the request via the network connection 108 (using the optional LAN 106 if present). The request is forwarded to the GIS 130 via the network 120. In response to the request, the GIS 130 transmits the position information to the MS 102 at 214. At 216, the MS 102 may relay the position information to an application, such as the retail services server 132 to request location-based services.

Those skilled in the arts will recognize that the communication protocol illustrated in FIG. 4 is merely an example of many different types of communication protocols that may be used to permit the MS 102 to obtain position information and location-based services. As noted above, the beacon 104 may be preprogrammed with position information. In that case, the beacon 104 may provide an address as well as position information (e.g., latitude, longitude and altitude) in 210 thus eliminating the need for the communication protocol of 212-214. Other variations will be readily apparent to those of ordinary skill in the art.

Figure 5:
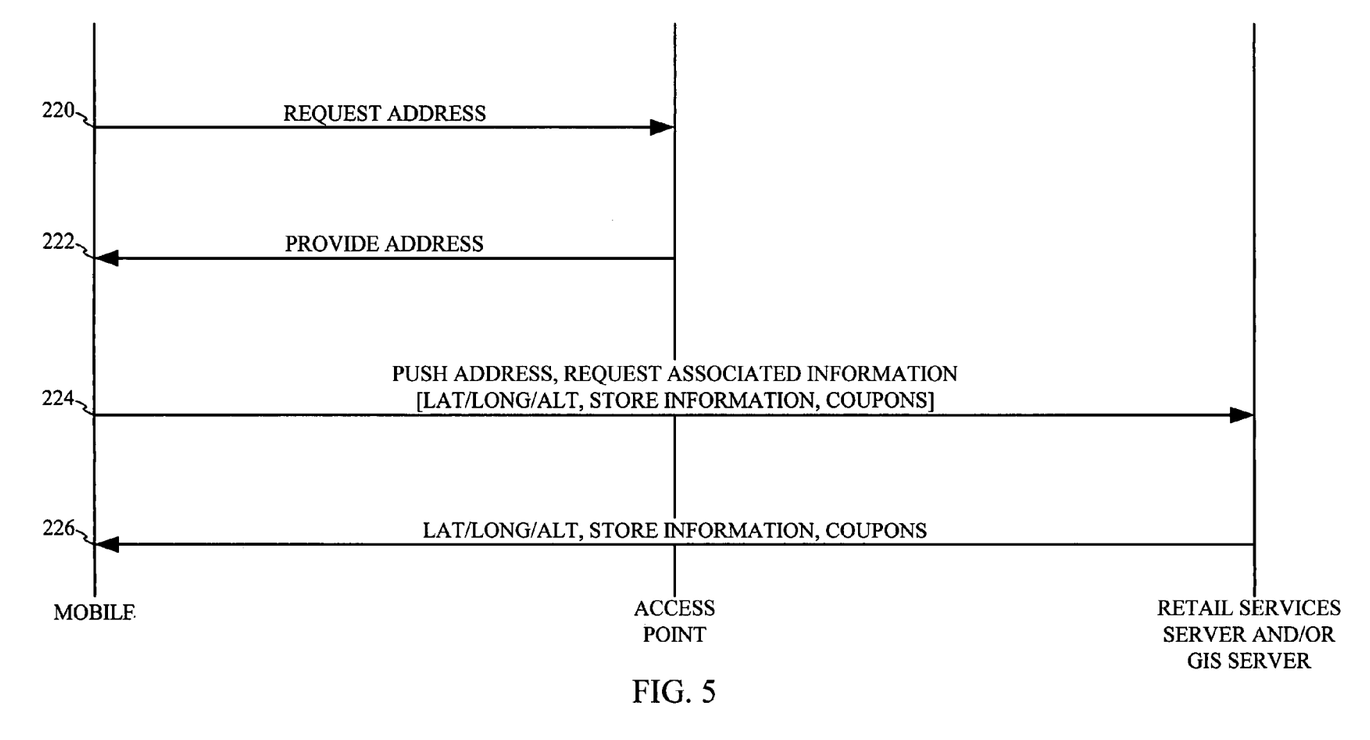
FIG. 5 illustrates a communication protocol for delivery of location-based services.

In another embodiment, the MS 102 may communicate directly with the beacon 104 to obtain location-based services without the need for the external position determination by a PDE (e.g., the PDE 126 of FIG. 1). An example of such communication protocol is illustrated in FIG. 5 where at 220, the MS 102 transmits an address request to the beacon 104. In addition to the address request, or as an alternative to the address request, the MS 102 may simply transmit a request for information related to the current position of the MS 102. For example, the consumer may already be aware of the current position, but simply request information related to, by way of example, a retail service provider at or near the position of the MS 102. For example, the user may be within a large store and request information regarding sales items in that retail store. In another example, the user may be near a movie theatre or a train station and request schedule information.

In 222, the beacon 104 provides the requested address information. At 224, the MS 102 pushes the address and request for associated information to the GIS 130 and/or the retail services server 132. At 226, information is returned to the MS 102 from the GIS 130 and/or the retail services server 132. That information may be in the form of position information (i.e., latitude, longitude and altitude) or location-based services, such as store information, sales coupons, schedules, and the like. In another alternative embodiment, the request for associated information may include, by way of example, a request for services by personnel. For example, a consumer in a retail store may request the assistance of a sales representative via the MS 102 using the system 100.

Those skilled in the art will appreciate that the communication protocol of FIG. 5 is merely an example and other alternative communication protocols may be satisfactorily implemented by the system 100. For example, a consumer may already know the current position of the MS 102 and merely want location-based services based on that current position. In that event, the communication at 220 at FIG. 5 may include an address request and/or a request for location-based services for the current position of the MS 102. In such an implementation, the beacon 104 may provide the address information to the GIS 130 and the retail services server 132. In turn, the GIS 130 and retail services server 132 return the requested information at 226. This example protocol implementation eliminates the communication protocol at 222 and combines elements of the communication protocol at 224 in communicating the request for location-based services directly from the beacon to the GIS 130 and the retail services server 132. Other alternative implementations of communications protocols will be readily apparent to those of ordinary skill in the art.

It should be noted that the example of communication protocols of FIGS. 4 and 5 need not require additional actions by the consumer to request the position information, such as in FIG. 4, or the location-based services, such as in FIG. 5. For example, in FIG. 5, the consumer typically takes some action to implement a request for address at 220. The communication protocols illustrated at 222-224 and the response at 226 all occur automatically in response to a single user action on the MS 102 to initiate the address request at 220. Thus, a number of transmissions occur transparent to the consumer to provide the desired location-based services. Similarly, automatic communications occur between the various entities illustrated in the communications protocol to provide the consumer with the current position information for the MS 102.

Figure 6:
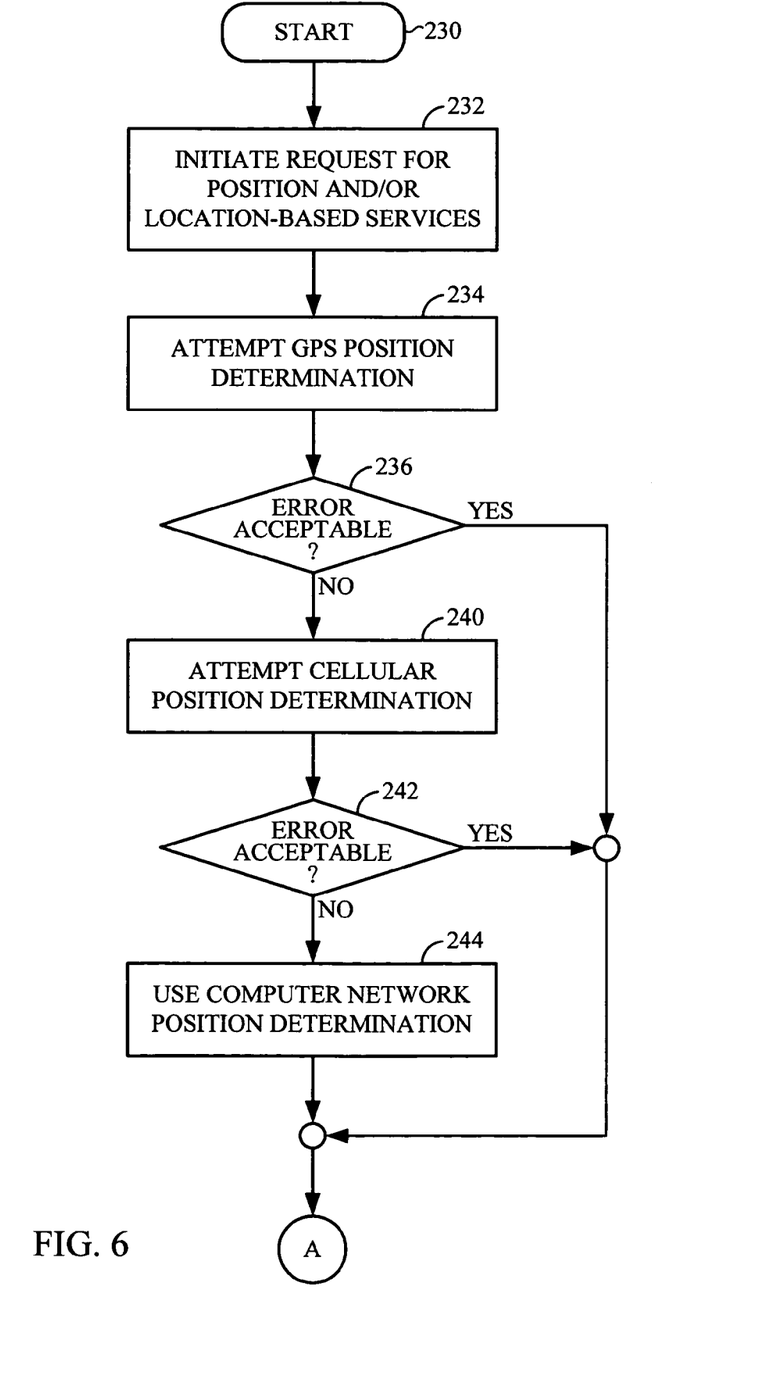
FIGS. 6 and 7 together form a flow chart illustrating the operation of an example embodiment of a system described herein.
Figure 7:
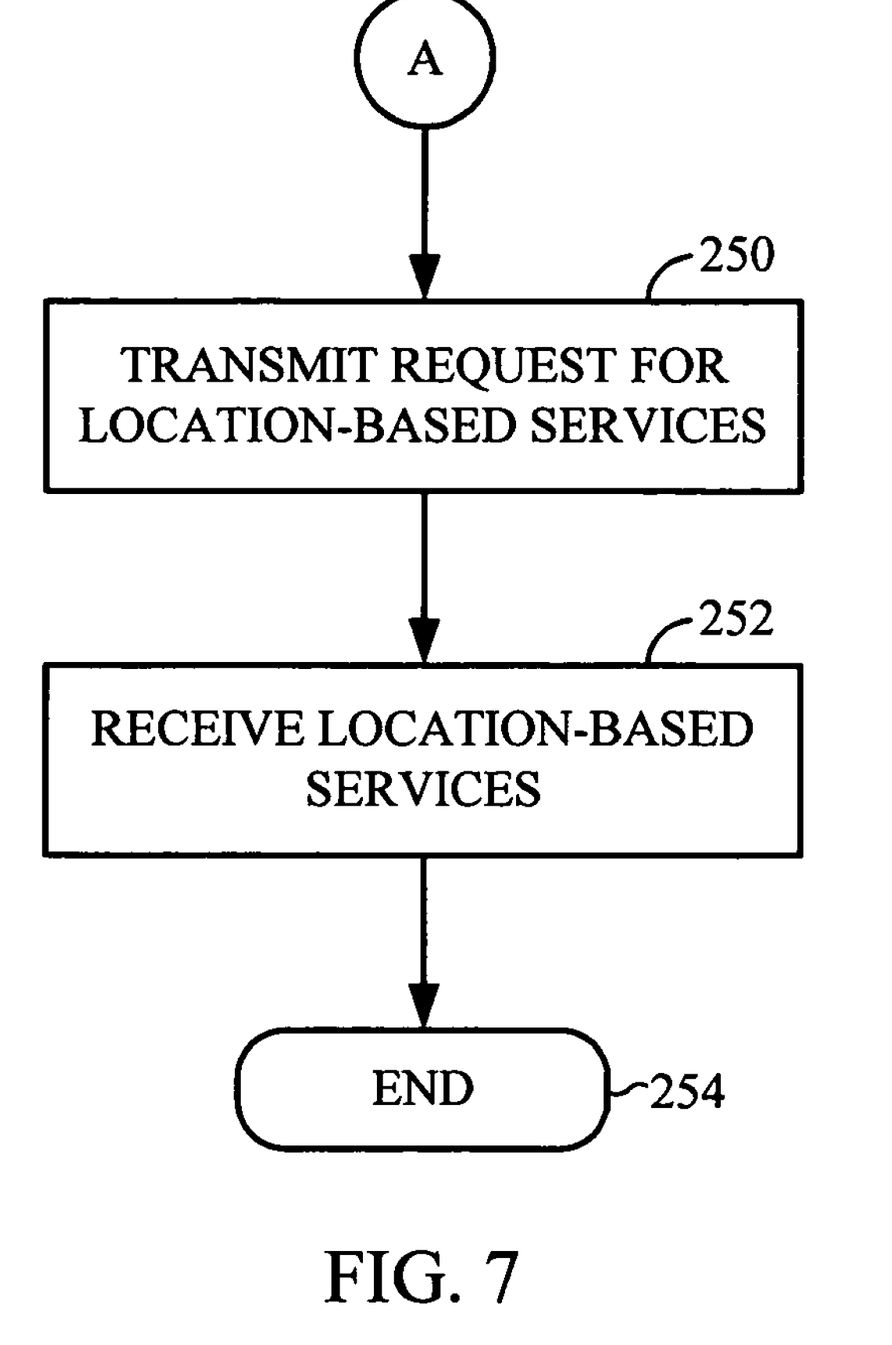

The operation of the system 100 is illustrated in the flow chart of FIGS. 6-7. At a start 230, illustrated in FIG. 6, the MS 102 is under power. At step 232, the MS 102 initiates a request for position information and/or location-based services. The request may be manually initiated by the user activating the input device 170 (see FIG. 2). Alternatively, the request may be automatically initiated. For example, a request may be periodically transmitted without the need for user intervention.

In step 234, the MS 102 will attempt GPS position determination. In step 236, the system 100 determines whether the GPS position determination was made with an acceptable error range. If the error range is acceptable, the results of decision 236 is YES and the system 100 proceeds to step 250, illustrated in FIG. 7.

If the GPS error determination is not acceptable, the result of decision 236 is NO and, in step 240, the MS 102 attempts cellular position determination. The cellular position determination may utilize, by way of example, the communication protocol defined by communication standard IS-801. Alternatively, the position of the MS 102 may be determined using communication signals, such as the pilot channel signal, as described above to determine the position of the MS 102 within a particular cell or particular sector within a cell.

In decision 242, the system 100 determines whether the position determination using cellular technology has an acceptable error range. If the error range is acceptable, the result of decision 242 is YES and the system moves to step 250 in FIG. 7. If the error range is unacceptable, the result of decision 242 is NO and, in step 244, the MS 102 utilizes the computer network position determination techniques described herein to determine the position of the MS 102. Following the determination of position in step 244 (or previous determination in step 240 or step 234), the system moves to step 250, illustrated in FIG. 7, to transmit a request for location-based services. In step 252, the MS 102 receives location-based services and the process ends at 254. Those skilled in the art will recognize that a variety of alternative implementations are possible. For example, position determination may be based on a weighted combination of position data from various sources that are weighted in accordance with the perceived error associated with each source. In another example alternative implementation, the consumer may only be interested in position and not interested in location-based services. In that event, steps 250 and 252 may be eliminated and position data provided to the user via the display 172 (see FIG. 2).

In one embodiment, the MS 102 advantageously integrates a GPS receiver subsystem, cellular communication subsystem and wireless computer network communication subsystem integrated into a single device (e.g., the MS 102) to provide position determination capability under a variety of conditions as well as location-based services. However, the system 100 may also be implemented without the three subsystems integrated into a single device. For example, the MS 102 may not include the GPS receiver 150 (see FIG. 2). In that event, the communication at step 234 into the associated decision 236 may be eliminated from the flow chart in FIG. 6. In another alternative embodiment, the MS 102 may not include cellular communication capability. In that event, step 240 and its associated decision 242 may be eliminated from the flow chart of FIG. 6. Thus, a number of different alternative embodiments are possible with the system 100.

The satisfactory implementation of multiple modes of operation serve to provide the consumer with a number of alternative pathways in which to determine the position of the MS 102 and to obtain location-based services. Such a device creates a new market for activities, such as Yellow Pages information and merchant based wireless coupons as well as providing accurate mapping information to merchant storefronts. The system 102 also provides sources of position information. The delivery of such location-based services may encourage merchants to provide beacons that allow implementation of the system 104 without the purchase of infrastructure by service providers, such as cellular telephone companies.

The system 100 provides for a variety of implementations to serve small merchants as well as large multi-chain merchants. In an implementation for a small merchant, the LAN 106 in FIG. 1 may be eliminated and the beacon 104 connected directly to a network, such as the Internet, via the network connection 108. The various components, such as the GIS 130 and the retail services server 132 provide the necessary information to the MS 102 via the network connection 108 and beacon 104 or via the BTS 110, as described above.

A large merchant may employ a plurality of beacons 104 distributed throughout the retail site. In such an implementation, the multiple beacons may typically be connected to the LAN 106 and coupled to the network 120 via the network connection 108. The network connection may be via the Internet, or the large merchant may have a back haul private network connection for higher speed connection with the network 120.

In yet another implementation a very large merchant may have a self-contained system in which a plurality of beacons 104 are distributed throughout the retail site and coupled to a central computer via the LAN 106. Such an implementation eliminates the need for a network connection. In such an implementation, the GIS 130 and retail services server 132 are part of the internal system of the very large merchant.

Delivery of location-based services by such a merchant may occur via the beacon 104 or via a network connection to the BTS 110.

The system 100 advantageously integrates a number of different communication components to provide the consumer with location-based services. The system provides economic incentive for merchants to install beacons and provide the consumer with a wide array of information.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. A position determination system comprising:
    a wireless computer network transceiver configured to communicate with a network wireless access point, the transceiver receiving data from the access point;
    a position determining entity to determine a position of the mobile communication device based on the data received from the access point;
    a display to display non position information data based on the determined position; and
    a global positioning system (GPS) receiver to receive data from a plurality of GPS satellites, and wherein the position determining entity is configured to determine the position of the mobile communication device based on the data received from the access point and the data received from the GPS satellites by generating a weighted combination of the data received from the GPS satellites and data from the wireless access point.

2. The system of claim 1 wherein the wireless computer network transceiver and the display are incorporated into mobile communication device and the position determining entity is located remote from mobile communication device.

3. The system of claim 1 wherein the wireless computer network transceiver is configured for operation in accordance with IEEE 802.11 wireless network standards.

4. The system of claim 1 wherein the displayed data based on the determined position further comprises position information.

5. The system of claim 4 wherein the position information is an address.

6. The system of claim 1 wherein position data related to a position of the wireless access point is stored in a management information base as part of the wireless access point, the displayed data based on the determined position being the position data of the wireless access point.

7. The system of claim 6 wherein the position data comprises at least one of location data and an address of the wireless access point.

8. The system of claim 6 wherein the position data further comprises a predicted range of the wireless access point.

9. The system of claim 1 wherein position data related to a position of the wireless access point is determined by a remote position determining entity, the displayed data based on position data of the wireless access point as determined by the remote position determining entity.

10. The system of claim 1 wherein the non position information is information related to a store located proximate the determined position of the mobile communication device.

11. The system of claim 1 wherein the transceiver communicates a request to the wireless access point for non position information based on the determined position of the mobile communication device.

12. The system of claim 1 wherein the non position information comprises a merchant identification associated with the wireless access point.

13. The system of claim 1 wherein the transceiver communicates a request to the wireless access point for at least one of sales information and assistance in a store located proximate the determined position of the mobile communication device.

14. The system of claim 1, further comprising a wireless telephone receiver to receive communication signals from a base transceiver station, the position determining entity using the communication signals from the base transceiver station to determine the position of the mobile communication device.

15. The system of claim 14 wherein the position determining entity generates a weighted combination of the communication signals from the base transceiver station and data from the wireless access point to determine the position of the mobile communication device.

16. The system of claim 14 wherein the wireless telephone receiver is configured for code division multiple access (CDMA) operation and the communication signals from a base transceiver station are CDMA pilot signals.

17. A position determination system comprising:
a global positioning system (OPS) receiver to receive data from a plurality of GPS satellites;
a wireless telephone receiver to receive communication signals from a base transceiver station;
a wireless computer network transceiver configured to communicate with a network wireless access point, the transceiver receiving data from the access point; and
a position determining entity to determine a position of a mobile communication device based on
the data received from the OPS satellites, if available with an acceptable error range,
the communication signals from the base transceiver station, if available with an acceptable error range, and
the data received from the network wireless access point.

18. The system of claim 17 wherein the position determining entity generates a weighted combination of at least two position data sources comprising data received from the GPS satellites, the communication signals from the base transceiver station, and the data received from the network wireless access point.

19. The system of claim 18 wherein the weighted combination of the at least two position data sources is based on predicted accuracy of the position data sources.

20. The system of claim 17 wherein the wireless computer network transceiver is configured for operation in accordance with IEEE 802.11 wireless network standards.

21. The system of claim 17 further comprising a display to display non position information data based on the determined position wherein the displayed data based on the determined position is position information.

22. The system of claim 17 further comprising a display to display non position information data based on the determined position wherein the displayed data based on the determined position is non position information.

23. The system of claim 17 wherein the transceiver communicates a request to the wireless access point for non position information based on the determined position of the mobile communication device.

24. The system of claim 17 wherein the wireless telephone receiver is configured for code division multiple access (CDMA) operation and the communication signals from a base transceiver station are CDMA pilot signals.

25. The system of claim 17 wherein the GPS receiver, the wireless telephone receiver and the wireless computer network transceiver are incorporated into the mobile communication device and the position determining entity is remote from the mobile communication device.

26. A mobile device comprising:
means for communicating with a computer network wireless access point and for receiving data from the access point;
means for determining a position of the mobile device based on the data received from the access point;
means for displaying non position information based on the determined position; and
means for receiving data from a plurality of GPS satellites, and wherein the means for determining the position of the mobile device comprises means for determining the position of the mobile communication device based on the data received from the access point and the data received from the GPS satellites by generating a weighted combination of the data received from the GPS satellites and data from the wireless access point.

27. The device of claim 26 wherein means for communicating with the computer network wireless access point is configured for operation in accordance with IEEE 802.11 wireless network standards.

28. The device of claim 26 wherein the displayed data based on the determined position further comprises position information.

29. The device of claim 26 wherein the non position information comprises information related to a store located proximate the determined position of the mobile device.

30. The device of claim 26 wherein the means for communicating with the computer network wireless access point communicates a request to the wireless access point for non position information based on the determined position of the mobile device.

31. The device of claim 26, further comprising means for receiving communication signals from a wireless telephone system base transceiver station, the means for determining the position of the mobile device using the communication signals from the base transceiver station to determine the position of the mobile device.

32. The device of claim 31 wherein the means for determining the position of the mobile device generates a weighted combination of the communication signals from the base transceiver station and the data received from the access point to determine the position of the mobile device.

* * * * *

UNITED STATES PATENT AND TRADEMARK OFFICE
CERTIFICATE OF CORRECTION

PATENT NO. : 7,647,055 B2  Page 1 of 1
APPLICATION NO. : 10/665747
DATED : January 12, 2010
INVENTOR(S) : Gum et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1126 days.

Signed and Sealed this

Twenty-eighth Day of December, 2010

David J. Kappos
*Director of the United States Patent and Trademark Office*